United States Patent [19]

Van Hekken

[11] Patent Number: 5,297,851
[45] Date of Patent: Mar. 29, 1994

[54] CHAIR FASTENING DEVICE

[75] Inventor: Hendrik R. Van Hekken, Allentown, Pa.

[73] Assignee: Westinghouse Electric Corp., Pittsburgh, Pa.

[21] Appl. No.: 802,591

[22] Filed: Dec. 5, 1991

[51] Int. Cl.$^5$ .............................................. A47C 7/02
[52] U.S. Cl. ........................ 297/452.14; 297/DIG. 2; 411/174; 411/183
[58] Field of Search ............... 297/DIG. 2, 457, 454, 297/444, 443, 440, 419, 420, 455, 456, 452; 411/172–175, 179, 180, 183, 177

[56] References Cited

U.S. PATENT DOCUMENTS

| | | | |
|---|---|---|---|
| 2,058,338 | 10/1936 | Meissner . | |
| 2,085,804 | 7/1937 | Hermann | 297/419 X |
| 2,102,554 | 12/1937 | Churchill . | |
| 2,127,696 | 8/1938 | Mitchel | 411/177 |
| 2,985,213 | 5/1961 | Consandine | 411/183 |
| 3,152,628 | 10/1964 | Strain et al. | 411/179 |
| 3,230,007 | 1/1966 | Spangler et al. | 297/457 X |
| 3,348,596 | 10/1967 | Leitner | 411/180 |
| 3,823,980 | 7/1974 | Harnick | 297/455 |
| 3,873,155 | 3/1975 | Barecki | 297/455 X |
| 4,010,519 | 3/1977 | Worthing | 24/141 |
| 4,073,539 | 2/1978 | Caruso | 297/DIG. 2 X |
| 4,690,599 | 9/1987 | Shinjo | 411/180 |
| 4,810,143 | 3/1989 | Muller | 411/181 |
| 4,919,578 | 4/1990 | Zeigler et al. | 411/113 |
| 4,957,402 | 9/1990 | Klein et al. | 411/84 |
| 5,018,789 | 5/1991 | Sheckells | 411/173 X |
| 5,123,702 | 6/1992 | Caruso | 297/DIG. 2 X |

FOREIGN PATENT DOCUMENTS 0307385 3/1989 European Pat. Off. ............. 411/174

OTHER PUBLICATIONS

Stafast Products, 1988 Catalog pp. 21, 34–35.

Primary Examiner—Kenneth J. Dorner
Assistant Examiner—Milton Nelson, Jr.
Attorney, Agent, or Firm—Carla J. Visansky

[57] ABSTRACT

A chair fastening device for securing a metal bracket to a seat pan of a chair thereby enabling arms, legs or pedestal bases with or without control mechanisms to be attached to the chair. The fastening device comprises a slab base weld nut which includes a slab base head that is captured and retained by parallel raised ribs formed in the plastic of the seat pan, thereby preventing rotation of the slab base weld nut, and an elongated barrel which is inserted through angled holes in the plastic seat pan and peened over in order to form a rivet connection with the underside of the plastic seat pan. The elongated barrel of the slab base weld nut is counterbored and further includes internal threads adapted to receive a screw or bolt for use in securing a metal bracket to the plastic seat pan without inducing stress fractures in the plastic, thus creating a strong, secure attachment for chair arms, legs or pedestal bases.

8 Claims, 4 Drawing Sheets

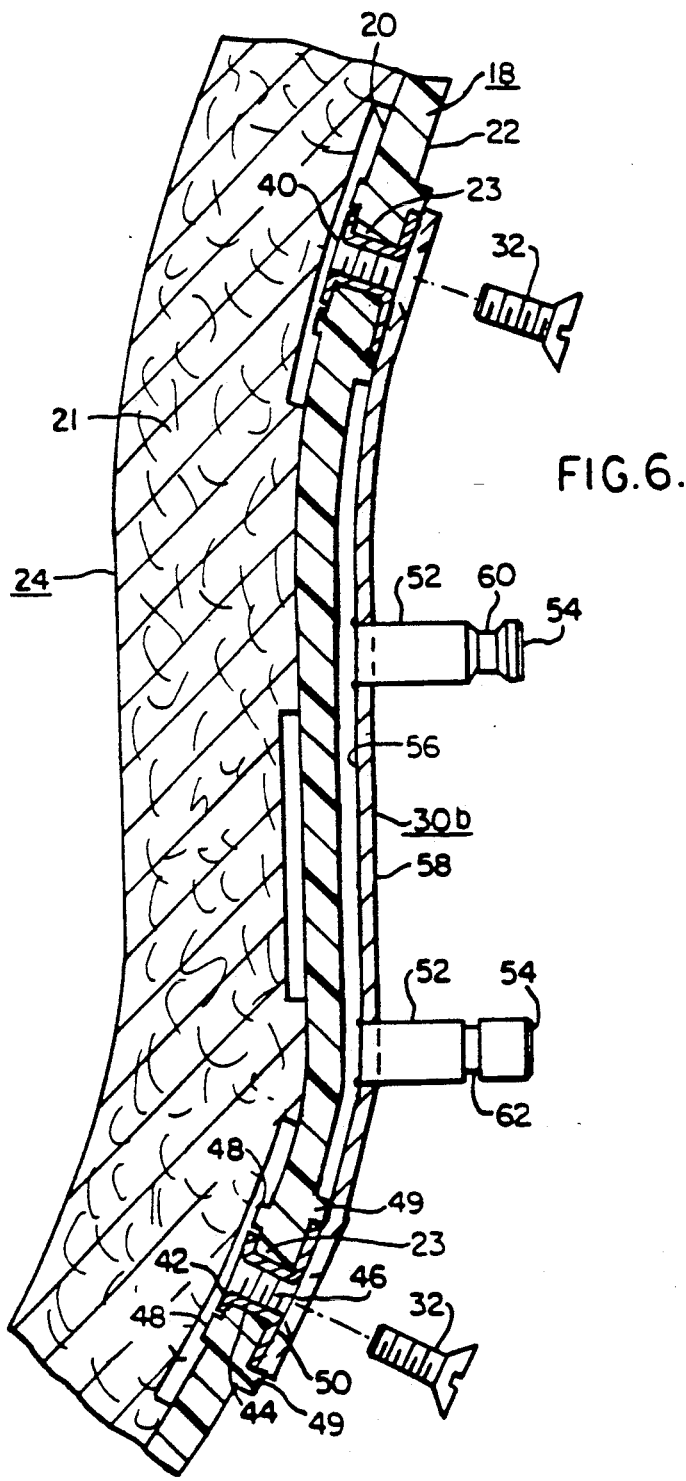

CHAIR FASTENING DEVICE

BACKGROUND OF THE INVENTION

1. Field of the Invention

This invention relates to a chair fastening device for attaching legs, arms and pedestal bases with or without control mechanisms to a chair and, more particularly to a slab base nut rivet for use in securing a metal bracket to a plastic seat pan of a chair without inducing stress fractures into the plastic.

2. Description of the Related Art

Fasteners are widely known in the art. The word "fastener" is a rather broad, generic term utilized so as to designate any device intended to be used in securing any article in place to another article. Various common fasteners or fastening devices include rivets, screws, bolts, nut elements, and the like which are used in connection with articles such as wood, metal, fabric, plastic and the like for any of a wide variety of diverse purposes.

It is extremely desirable to be able to install a fastener in such a manner that the fastener is incapable of relative movement with respect to the member upon which it is installed as well as resistant to torque caused by screwing a bolt into the fastener.

Previously, in the furniture industry, self-piercing "T-nuts" were utilized as fasteners in order to secure chair arms, legs or pedestal bases with or without control mechanisms to seat pans made of thin, flexible material such as plastic. However, the prongs of the "T-nut" would cause stress fractures in the plastic thus creating a rather weak attachment. Presently, weld nuts with slab base heads, commonly used as welded fastener inserts in metal products, were used in place of the self-piercing "T-nuts" but the slab base heads of the weld nuts could not be secured to the plastic seat pans without using a secondary operation such as gluing or stapling.

Consequently, there exists a need to secure a fastener such as a slab base weld nut to chair seat pans made of thin, flexible material such as plastic with drafted holes in such a way as to create a strong, secure attachment without the use of an elaborate secondary operation, while at the same time preventing torque rotation, preventing stress fractures, and resisting the entry force of screw installation into the fastener insert. It is the solution of this and other problems to which the present invention is directed.

SUMMARY OF THE INVENTION

In accordance with the present invention, the foregoing deficiencies of prior art are obviated by providing an improved fastening construction for securing a metal bracket to a seat pan of a chair having a molded plastic seat pan. A plurality of predeterminately spaced drafted angle holes extend through the plastic seat pan and parallel raised rib members are provided on opposite side edges of the drafted angle holes on one side of the plastic seat pan. A slab base nut rivet having an elongated barrel extends through the drafted angle holes and the slab base head on one end thereof is disposed between the parallel raised rib members thereby preventing rotation of the slab base nut. The other end of the elongated barrel is peened over to form a rivet connection with the opposite side of the plastic seat pan.

BRIEF DESCRIPTION OF THE DRAWINGS

While the specification concludes with the claims particularly pointing out and distinctly claiming the subject matter of the invention, it is believed the invention will be better understood from the following description, taken in conjunction with the accompanying drawings, wherein:

FIG. 6 is a sectional view of a metal bracket being secured to the seat pan of the chair illustrated in FIG. 2 by way of the improved fastening construction of this invention.

DESCRIPTION OF THE PREFERRED EMBODIMENT

The invention herein described provides a chair fastening device for use in securing a fastener to a seat pan of a chair, thereby enabling arms, legs or pedestal bases with or without control mechanisms to be attached to the chair. The fastener is secured in such a way as to provide a strong, secure attachment while eliminating torque rotation, preventing stress fractures in the plastic of the seat pan, resisting the entry force of screw installation and obviating the need for a secondary operation of attachment.

Figure 1:
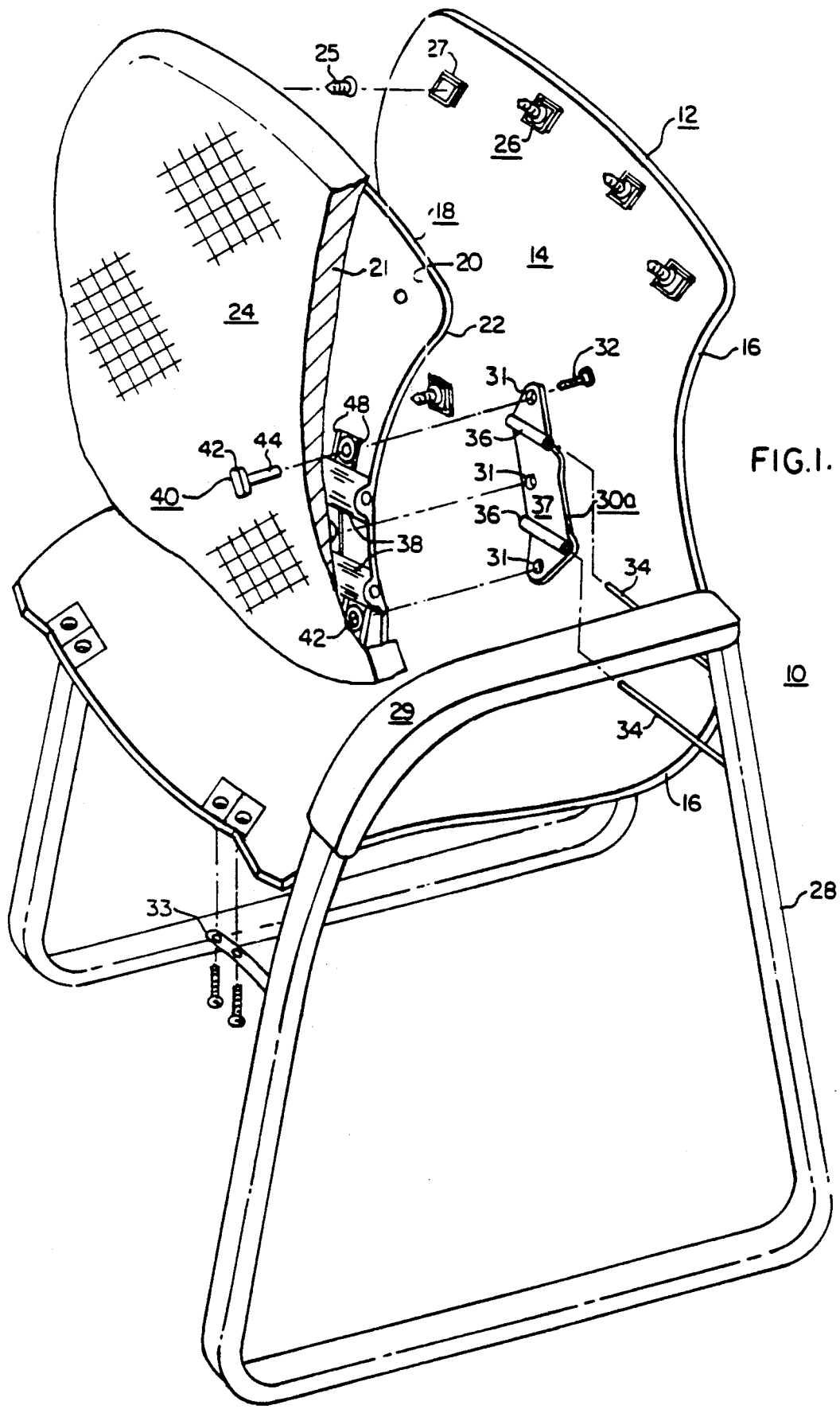
FIG. 1 is an exploded perspective view of a chair with both arms and leg frames being attached in accordance with this invention.

Referring now in detail to the drawings wherein like reference characters represent like parts throughout the several views, there is illustrated in FIG. 1 an arm chair 10 having a plastic seat back 12 which includes a topside 14 and an underside 16 and a plastic seat pan 18 (which is partially shown) which includes a frontside 20, a backside 22, a plurality of drafted angle holes 23 (see FIG. 4) and a foam backing 21 which is covered by a material 24 such as fabric or leather. The backside 22 of the plastic seat pan 18 is attached to the topside 14 of the plastic seat back 12 by way of "Christmas trees" 26, which are little plastic screw anchors 25 rotatably mounted in plastic frames 27, thereby enabling the seat pan 18 and the seat back 12 to be snapped together.

Leg frames 28 and armpads 29 are attached by way of a metal bracket 30 having holes 31 therein, whereby the metal bracket 30 is attached to the plastic seat pan 18 basically by way of threaded screws or bolts 32. The exact means of attaching the metal bracket 30 to the plastic seat pan 18 by way of the fastening means of this invention will be later described in detail. The leg frames 28 are also attached to the arm chair 10 by metal pins 33 which are secured to the underside 16 of the plastic seat back 12 by screws.

FIG. 1 illustrates one embodiment of attachment whereby pin members 34 project from the leg frame 28 of an arm chair 10 and are inserted into hollow cylindrical tube means 36 of the metal bracket 30a which are located on one side 37 of the bracket 30a and spaced in parallel at a predeterminate distance. The hollow cylindrical tube means 36 of the metal bracket 30a are positioned in recesses 38 which are formed in the backside 22 of the injection molded plastic seat pan 18, thereby enabling the metal bracket 30a to be fit against the backside 22 of the plastic seat pan 18 and to be attached to the backside 22 of the plastic seat pan 18 by way of threaded screws or bolts 32. The screws 32 are placed through holes 31 in the metal bracket and into a threaded fastener 40 which includes a slab base weld nut having a flat, slab base head 42 and an elongated barrel 44 which is counterbored and contains internal threads 46 (more fully illustrated in FIG. 4).

The fastener 40 is inserted through a drafted angle hole 23 in the plastic seat pan 18 and is prevented from rotating on the plastic seat pan 18 by means of raised rib members 48 formed into the plastic of the frontside 20 of the injection molded plastic seat pan 18. Circular raised mounting surfaces 49 are located on the backside 22 of the plastic seat pan 18. A rivet connection 50 on the backside 22 of the plastic seat pan 18 secures the fastener 40 to the plastic seat pan 18.

Figure 2:
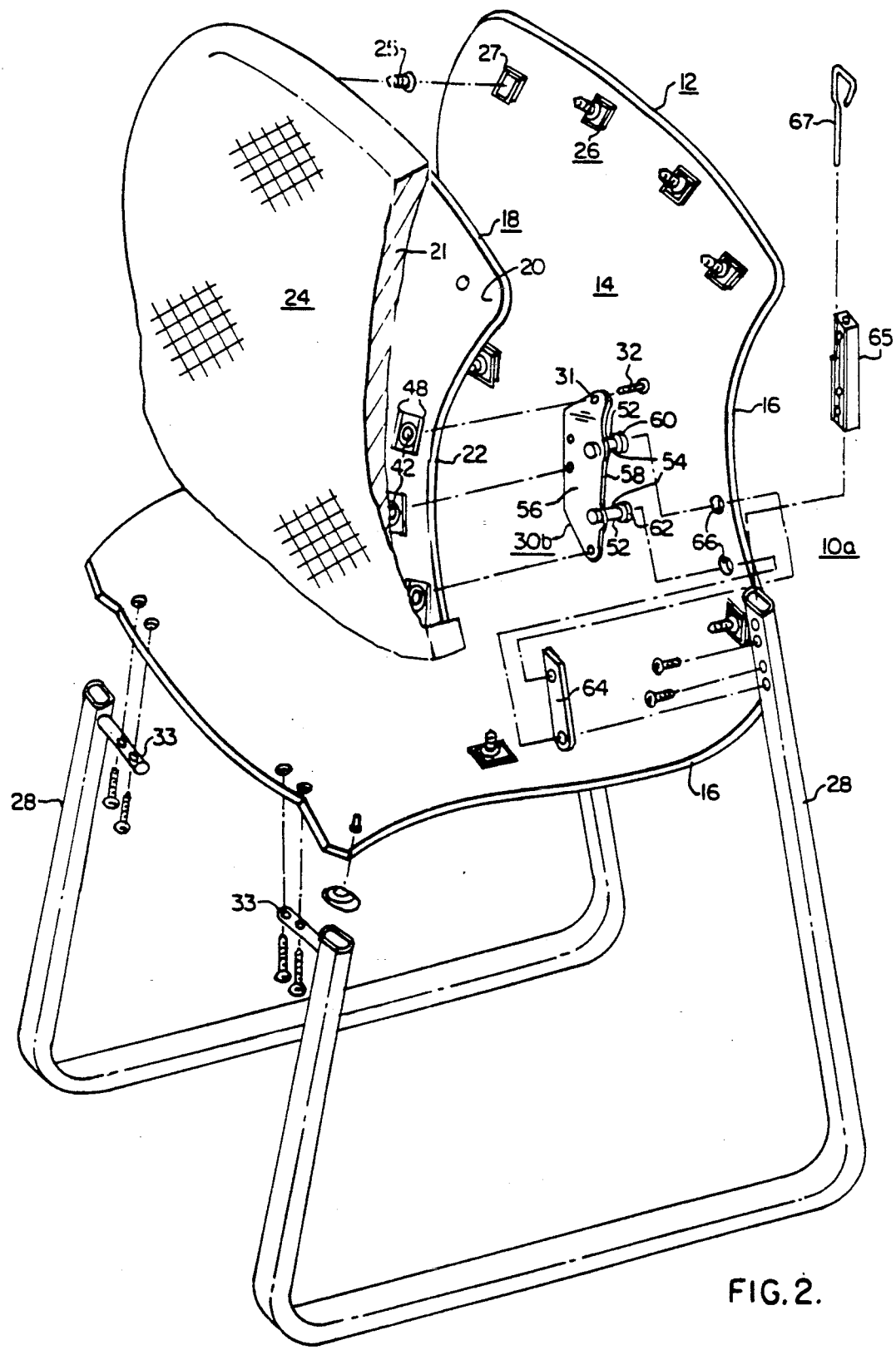
FIG. 2 is an exploded perspective view of an armless chair with only leg frames being attached.

FIG. 2 illustrates an alternative embodiment of attachment of leg frames 28 to an armless chair 10a. As previously described, the plastic seat back 12 is attached to the plastic seat pan 18, which is covered with foam backing 21 and material 24, by way of "Christmas trees" 26. The fastener 40 is inserted through a drafted angle hole 23 and retained in the plastic seat pan 18 by raised rib members 48 formed in the plastic of the injection molded plastic seat pan 18 and a rivet connection 50 whereby a metal bracket 30b can be attached by threaded screws or bolts 32 so that the leg frames 28 can be attached. The legs are also attached by metal pins 33 as previously mentioned.

However, the metal bracket 30b for the armless chair 10a varies from the metal bracket 30a for the arm chair 10 in that the metal bracket 30b for the armless chair 10a includes stud means 52 having metal knob projections 54 that are welded to one side 56 of the metal bracket 30b and extend perpendicularly from the opposite side 58 of the metal bracket 30b and are spaced a predeterminate distance from each other. The metal knob projections 54 include one wide notch 60 and one narrow indentation 62. The projections 54 extend through apertures 66 in the chair back 12, a spacer 64 and into a positioning insert 65 inside the tubular leg frame 28. A locking clip 67 enters notches 60 and 62 thereby securing the seat back 12 to the leg frame 28.

Figure 4:
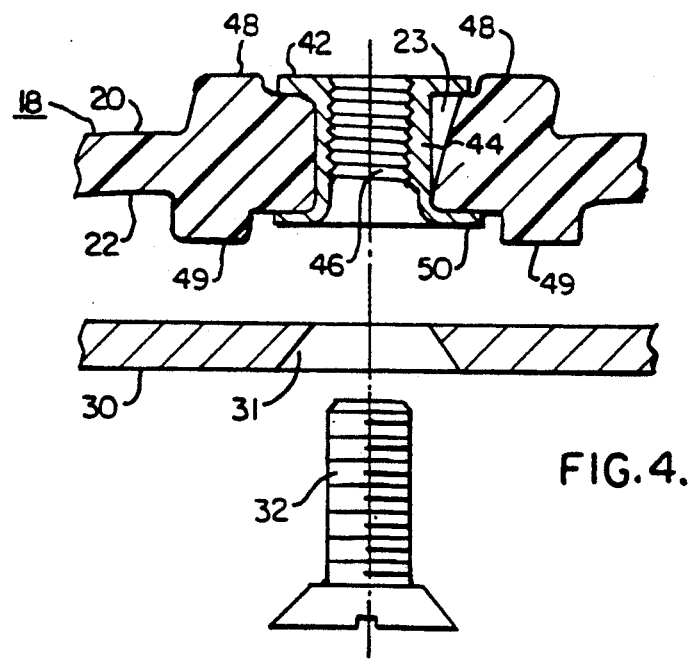
FIG. 4 is an exploded view, partly in section, of a metal bracket being secured to a seat pan of a chair by way of the improved fastening construction of this invention, taken along the line 4—4 of FIG. 3.

FIGS. 4 and 6 illustrate a sectional view of the way in which the metal brackets 30a or 30b are used in attaching leg frames 28 to either the chair 10 or the armless chair 10a. The bracket is secured to the plastic seat pan 18 by way of the fastener 40. As previously mentioned, the fastener 40 is inserted through one of a plurality of drafted angle holes 23 which are predeterminately spaced and formed into the plastic of the seat pan 18 by an injection molding process. Drafted angle holes 23 are not true diameter holes, but are holes with an oval shaped opening on one side of the plastic which is angled in the direction of draw of the molding pins used in the injection molding process. Since the fastener 40 is not hole size or shape sensitive, a drafted angle hole 23 with the drafted angle in the direction of the draw can be utilized, thereby reducing the costly and elaborate process of trying to obtain a straight diameter hole by either hydraulic cylinders in the injection molded tooling or a secondary drilling operation.

Figure 3:
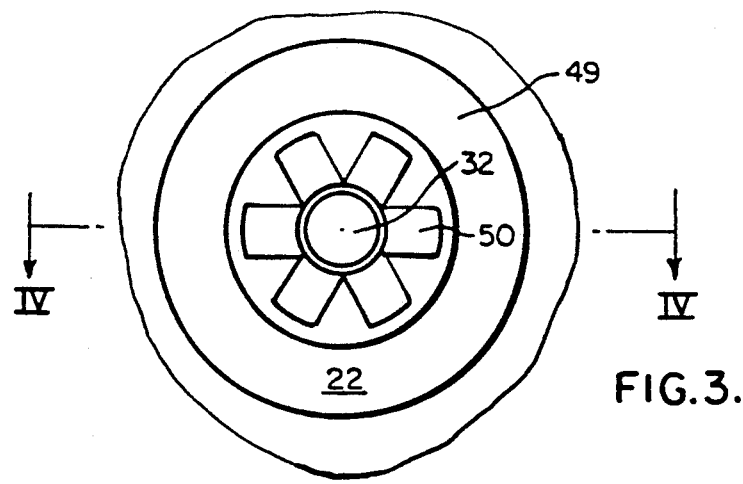
FIG. 3 is a bottom plan view of the rivet connection of the improved fastening construction of this invention.
Figure 5:
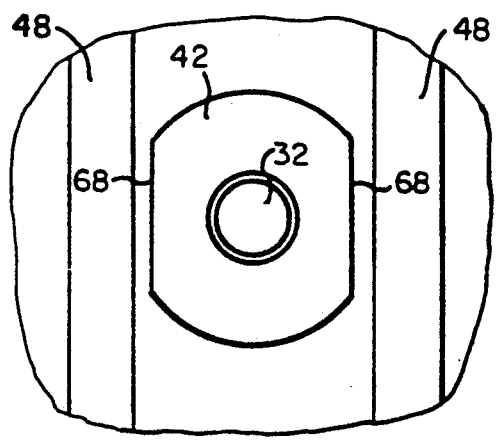
FIG. 5 is a top plan view of the slab base weld nut being retained by parallel raised rib members of the improved fastening construction of this invention.

The fastener 40, after being inserted through a drafted angle hole 23, is retained in the plastic seat pan 18. The slab base head 42, which is located on one end of the fastener 40, is prevented from rotating by raised rib members 48 formed in the frontside 20 of the plastic seat pan 18 and spaced in parallel on either side of one of the drafted angle holes 23. The slab base head 42 includes at least two flat edges 68, see FIG. 5, which are captured and retained by the raised rib members 48 thereby preventing rotation by the torque force which is created by screw rotation as the threaded screw 32 is threaded into the threaded fastener 40 without producing stress fractures in the plastic of the seat pan 18. The fastener 40 is further secured in the plastic seat pan 18 by a rivet connection 50, which may appear in the shape of a starburst, see FIG. 3, which is created by peening over the elongated barrel 44 of the fastener 40 onto the backside 22 of the seat pan 18 and surrounded by circular raised mounting surfaces 49 which are formed in the plastic on the backside 22 of the plastic seat pan 18. This peening over to produce a rivet connection 50 aids in resisting the axial force that results from driving the threaded screw 32 into the internal threads 46 which are located on the interior of the elongated barrel 44 of the fastener 40. Finally, the metal bracket 30 is secured to the plastic seat pan 18 by inserting a threaded screw 32 through one of the holes 31 in the metal bracket 30 and driving the threaded screw 32 into the counterbored internal threads 46 contained in the elongated barrel 44 of the fastener, causing the metal bracket to be placed up against the mounting surfaces 49 of the backside 22 of the plastic seat pan 18 and secured to the plastic seat pan 18, as is illustrated in FIGS. 4 and 6.

Therefore, the invention provides a chair fastening device for use in attaching arms, legs or pedestal bases with or without control mechanisms to a chair which includes in combination a slab base head retained by raised rib members formed in the plastic of the seat pan of a chair and a rivet connection thereby preventing the torque rotation, the pullout force and the axial force of the threaded screw used to attach a metal bracket to the plastic seat pan of a chair. Thus, a metal bracket may be secured to chair seat pans constructed of thin, flexible material such as plastic by utilizing a fastener which creates a strong, secure attachment while at the same time preventing stress fractures in the plastic without the need for a more expensive, time intensive secondary operation.

I claim:

1. A fastener for securing a metal bracket to a seat pan of a chair comprising:
    an injection molded plastic seat pan having a front side, a back side and including a plurality of predeterminately spaced oval drafted angle holes and parallel standing rib members formed in the plastic on the front side of said plastic seat pan, said standing rib members surrounding said oval holes; and
    a slab base weld nut having a slab base head which is captured and retained by said standing rib members thereby preventing rotation of said slab base nut and an elongated barrel having internal threads and extending through at least one of said oval holes and being peened over to form a rivet connection with the back side of said plastic seat pan.

2. A fastener according to claim 1 further including a metal bracket and at least one threaded bolt, said metal bracket having at least one hole therein, said at least one threaded bolt extending through said at least one hole and being threaded into said internal threads of said barrel of said slab base weld nut to threadedly secure said metal bracket to said plastic seat pan.

3. A fastener according to claim 2 wherein said metal bracket includes means for attaching legs, arms and pedestal bases to said plastic seat pan.

4. A fastener according to claim 3 wherein said means for attaching legs, arms and pedestal bases to said metal bracket includes hollow cylindrical tube means.

5. An improved fastening construction for securing a metal bracket to an injection molded plastic seat pan of a chair, said fastening construction comprising:
- a molded plastic seat pan having a front side, a back side and a plurality of predeterminately spaced drafted angle holes therethrough and parallel raised rib members located on said front side of said seat pan and disposed on opposite side edges of said drafted angle holds; and
- a slab base nut rivet having an elongated barrel and internal threads extending through at least one of said drafted angle holes, said elongated barrel including two ends, one end of said elongated barrel having a slab base head being disposed between and retrained by said parallel raised rib members thereby preventing rotation of said slab base nut, and a second end of said elongated barrel being peened over to form a rivet connection on said back side of said plastic seat pan.

6. The improved fastening construction according to claim 5 further including a metal bracket and at least one threaded bolt, said metal bracket having at least one hole therein, said at least one threaded bolt extending through said at least one hole and being threaded into said internal threads of said barrel of said slab base nut rivet to threadedly secure said metal bracket to said molded plastic seat pan.

7. The improved fastening construction according to claim 6 wherein said metal bracket includes means for attaching legs, arms and pedestal bases to said molded plastic seat pan.

8. The improved fastening construction according to claim 7 wherein said means for attaching legs, arms and pedestal bases to said metal bracket includes hollow cylindrical tube means.

* * * * *